United States Patent [19]
Ouellette

[11] Patent Number: 6,024,518
[45] Date of Patent: Feb. 15, 2000

[54] AIR CONVEYOR WITH CONVEYED OBJECT HOLD DOWN GUIDE RAIL

[75] Inventor: Joseph F. Ouellette, Glendale, Mo.

[73] Assignee: Ouellette Machinery Systems, Inc., Fenton, Mo.

[21] Appl. No.: 09/034,713

[22] Filed: Mar. 4, 1998

[51] Int. Cl.$^7$ ................................................. B65G 53/28
[52] U.S. Cl. ............................................................. 406/88
[58] Field of Search .......................................... 406/86–88

[56] References Cited

U.S. PATENT DOCUMENTS

| | | | |
|---|---|---|---|
| 5,246,314 | 9/1993 | Smith et al. | 406/88 |
| 5,437,521 | 8/1995 | Ouellette | 406/88 |
| 5,611,647 | 3/1997 | Ouellette | 406/88 |

*Primary Examiner*—Jospeh E. Valenza
*Attorney, Agent, or Firm*—Howell & Haferkamp, L.C.

[57] ABSTRACT

A guide is employed on air conveyors of the type that suspend conveyed objects from an intermediate enlargement, for example, conveying plastic bottles by suspending the bottles from their neck rings, where the guide limits the upward movement of the bottles conveyed by a conveyor system preventing the bottles from becoming wedged in the air conveyor and jamming the flow of bottles through the air conveyor while permitting each of the bottles conveyed to swing freely forwardly and rearwardly from their neck rings as the bottles are conveyed through the conveyor.

20 Claims, 2 Drawing Sheets

AIR CONVEYOR WITH CONVEYED OBJECT HOLD DOWN GUIDE RAIL

BACKGROUND OF THE INVENTION

(1) Field of the Invention

The present invention pertains to a guide employed on air conveyors of the type that suspend conveyed objects from an intermediate enlargement, for example, conveying plastic bottles by suspending the bottles from their neck rings, where the guide limits the upward movement of the objects thereby preventing the objects from becoming jammed in the conveyor system. More specifically, the present invention pertains to a guide that limits the upward movement of plastic bottles conveyed by a conveyor system preventing the bottles from becoming wedged in the air conveyor and jamming the flow of bottles through the air conveyor while permitting each of the bottles conveyed to swing freely forwardly and rearwardly from their neck rings as the bottles are conveyed through the conveyor.

(2) Description of the Related Art

An air conveyor is useful in the rapid transport of plastic bottles between work stations as, for example, between a blow molding station and a palletizing station. Air conveyors of this type are disclosed in the U.S. patents of Ouellette, U.S. Pat. No. 5,437,521 issued Aug. 1, 1995, and U.S. Pat. No. 5,611,647 issued Mar. 18, 1997, both of which are incorporated herein by reference.

FIG. 1 shows an end elevation view of a typical air conveyor. The conveyor includes a conveyor channel 12 having a generally inverted U-shaped configuration with a top wall 14 and laterally spaced sidewalls 16, 18. Together, the channel top wall 14 and sidewalls 16, 18 give the conveyor channel its general, inverted U-shaped configuration surrounding an interior volume 22 of a conveyor channel. The sidewalls 16, 18 of the conveyor channel have lower sections 24, 26, respectively, connected to the upper sidewalls by threaded fasteners 28, 32. The two lower sections of the sidewalls 24, 26 have pluralities of air duct outlets 34, 36 that extend through the conveyor channel sidewalls. The configurations of the air duct outlets 34, 36 direct jets of air ejected from the outlets to strike bottle containers conveyed by the air conveyor in the area of the shoulder of the containers, thereby forcing the containers to travel downstream along the length of the air conveyor.

Each of the air duct outlets 34, 36 is fed with pressurized air conveyed through air ducts 38, 42 that extend through the upper portions of the conveyor channel sidewalls 16, 18. These air ducts 38, 42 extend from the top surface of the conveyor channel top wall 14 completely through the channel sidewalls 16, 18 to the sidewall lower sections 24, 26.

Branch portions 44, 46 of the air ducts extend partially through the conveyor channel sidewalls 16, 18 and exit the sidewalls into the conveyor channel interior volume through vacuum port openings 48, 52. The air duct branch portions 44, 46 communicate with the air duct outlets 34, 36. As pressurized air passes through the air ducts 38, 42 in the sidewalls and then through the air duct outlets 34, 36, a venturi effect is created in the air duct outlets 34, 36 that draws a suction through the branch portions 44, 46 and vacuum port openings 48, 52. This suction reduces the air pressure in the upper portion of the channel interior volume 22.

The channel interior volume 22 is divided into an upper portion and a lower portion by a pair of laterally spaced, longitudinally extending flanges 54, 56. The pair of flanges extend from the pair of channel sidewalls 16, 18 into the channel interior volume 22 and mutually oppose each other defining a slot 58 therebetween. The left side flange 54 as viewed in FIG. 1 is held between projecting portions of the conveyor channel sidewall 16 and the sidewall lower section 24 on the left side of the channel by a plurality of set screws 62, only one of which is shown in FIG. 1. The flange 56 on the right side of the channel is held between a projecting portion of the conveyor channel sidewall 18 and the sidewall lower section 26 by a plurality of set screws 62, only one of which is visible in FIG. 1. By loosening the set screw 62, the flanges 54, 56 can be removed from the conveyor channel entirely and replaced with new flanges, or can be adjustably positioned laterally toward and away from each other to adjust the lateral width of the slot 58. In bottle conveyors, the lateral width of the slot 58 is adjusted to be sufficiently large to receive the neck of a bottle container therein with the annular rim or neck ring of the bottle supported on top surface margins 64, 66 of the flanges with the tapered shoulder and body of the bottle suspended below the pair of flanges.

An air plenum 68 extends longitudinally along the top wall 14 of the conveyor channel. The plenum 68 is comprised of a pair of sidewalls 72, 74 and a top wall 76 that surround an interior 78 of the plenum. As shown in FIG. 1, a connecting plate 82 is positioned just above the conveyor channel top wall 14 and is connected to the opposed air plenum sidewall 72, 74. The connecting plate 82 is employed in connecting together adjacent lengths of the conveyor channel end-to-end and is only present at the connection between the two lengths of conveyor channel. It does not extend the entire longitudinal length of the conveyor channel as does the channel top wall 14 which acts as the bottom wall of the air plenum 68. As shown in FIG. 1, the connecting plate 82 is connected to the top wall 14 of the conveyor channel by a threaded fastener 84 and is also connected to the opposed air plenum sidewalls 72, 74 by a pair of threaded fasteners 86. When the connecting plate 82 overlays the air ducts 38, 42 of the conveyor channel, a pair of holes 88, 92 are provided in the connecting plate 82 in order to maintain communication of the pressurized air in the air plenum 68 with the conveyor channel air ducts 38, 42.

In operation of the conveyor channel 12, air is supplied at a regulated pressure to the plenum interior volume 78 by a conventional blower (not shown). The air pressure supplied to the plenum interior is directed through the holes 88, 92 of the connecting plate 82 where present, and through the sidewall air ducts 38, 42 and is ejected through the air duct outlets 34, 36. The jets of air ejected from the air duct outlets 34, 36 cause the object or bottle suspended in the slot 58 to be conveyed along the slot in a desired downstream direction. The venturi effect created in the air ducts draws a vacuum pressure through the vacuum port openings 48, 52 which open into the conveyor channel interior volume above the pair of flanges 54, 56. The vacuum created in the channel above the flanges exerts an upwardly pulling force on the upper portion of the bottle container suspended from its annular ring in the slot and thereby reduces the friction drag of the bottle annular ring supported on the top surface margins 64, 66 of the flanges.

As stated earlier, air conveyors of the type just described and other similar air conveyors are employed to transport empty plastic bottles, although it is conceivable they could be configured to transport other objects having an intermediate enlargement such as the neck ring of the bottles, with an upper portion of the object such as the bottle neck positioned above the intermediate enlargement and a lower portion of the object such as the bottle shoulder and body positioned below the intermediate enlargement. The ability to adjust the position of the conveyor flanges 54, 56, or to replace flanges with those of different sizes, enables air conveyors of the type described to transport a variety of bottles having different shapes and configurations. For example, the air conveyors are employed in transporting plastic bottles having a 28 millimeter diameter neck opening at their tops such as those provided on conventional one liter quart bottles, as well as transporting bottles having a 38 millimeter diameter neck opening at their tops such as that employed on the "wide mouth" type bottles.

In transporting plastic bottles by air conveyors, it has been found that it is desirable to give the upper portion or neck of the bottle a longitudinally downstream angled orientation as the bottle is transported along the longitudinal length of a conveyor. With this orientation of the bottle relative to the conveyor, the bottles have a lesser tendency for jamming in the conveyor slot. In order for the bottle to obtain this orientation when being transported along the conveyor, the bottle must be free to swing forwardly and rearwardly from the annular neck ring or intermediate enlargement supporting the bottle on the conveyor flanges. However, in providing clearance for the swinging movement of the bottles on the flanges of the air conveyor, the bottles are capable of moving vertically upward relative to the air conveyor, resulting in their annular neck rings being lifted from supporting engagement with the top surface margins of the conveyor flanges. It has been observed that, when a series of bottles are stopped along an air conveyor for whatever reason, when a moving bottle contacts the stopped bottles, it will have a tendency to move upwardly relative to the air conveyor on impact of the bottles together. It has also been observed at times that the upward movement of a bottle at impact with stationary bottles will result in the tapered shoulders of the bottle below the neck ring becoming wedged between the opposed edges of the conveyor flanges, jamming the bottle between the flanges. It has also been observed that plastic bottles exhibit a polarity attraction to each other shortly after their being blow molded. When a conveyed bottle strikes a stationary bottle on an air conveyor shortly after the bottles have been blow molded, not only will the bottle at times move upwardly resulting in its tapered shoulders becoming wedged and jammed between the conveyor flanges, the polarity attraction between adjacent bottles will contribute to holding the jammed bottle in its position wedged between the opposed conveyor flanges. What is needed to overcome this problem is an improvement to the air conveyor that limits the upward movement of conveyed bottles relative to the conveyor slot while still permitting the free forwardly and rearwardly swinging of the bottles suspended from their annular neck rings on the flanges of the conveyor.

SUMMARY OF THE INVENTION

The present invention provides a guide rail that limits the extent of upward movement of an object, such as a plastic bottle, conveyed by an air conveyor and thereby prevents the lower portion of the object below its intermediate enlargement from becoming wedged and jammed between the opposing edges of the conveyor flanges, as can occur when upward movement of the object relative to the flanges is unlimited. The guide can be retrofit to substantially any type of air conveyor or can be formed as an integral part of the conveyor, for example as a part of an aluminum extrusion of the conveyor channel. While the guide is designed to limit the upward movement of the conveyed object relative to the conveyor channel to prevent the object from becoming jammed between the flanges, it does not interfere with the free swinging movement of the object forwardly and rearwardly in the conveyor slot while the object is suspended from the conveyor flanges by its intermediate enlargement.

In the preferred embodiment of the invention, the guide is formed from a thin strip of material having a length corresponding to the length of the conveyor channel with which the guide is to be used, although the length of the guide can vary. Preferably, the material employed in constructing the guide is aluminum, although other types of similar materials may be employed. The guide is formed with a flat, middle surface extending along its entire length. The middle surface is provided with a plurality of apertures for use in attaching the guide to the conveyor channel in the channel interior volume. The fastener apertures are preferably spacially arranged along the length of the guide at positions corresponding to positions of fasteners already present in the conveyor channel top surface. This enables the use of the conveyor channel fasteners in attaching the guide to the conveyor channel top surface. On laterally opposite sides of the guide middle surface, two side surfaces of the strip of material are angled downwardly by bending or other equivalent methods. The angled side surfaces are mirror images of each other and extend along the entire length of the guide.

The guide is assembled to the conveyor channel top wall in the interior volume of the channel in a position centered above the conveyor channel slot. With the guide middle surface attached to the top wall of the channel by the fasteners present in the top wall, the two side surfaces angle downwardly from the channel top wall. The two side surfaces are positioned directly above the conveyor slot and flanges. The extent to which the two side surfaces extend downwardly limits the upward movement of an object conveyed in the conveyor channel on the flanges. Objects having an intermediate enlargement that supports the object for sliding movement on the top surface margins of the flanges, such as a plastic bottle, and which have upper parts and lower parts, for example the bottle neck and the bottle shoulder respectively, are free to swing forwardly and rearwardly in the conveying path with the intermediate enlargement supported on the flanges. However, should objects, such as the plastic bottles, come in contact with each other while being conveyed, the upward movement of the object through the slot will be limited by the upper part of the object contacting the downwardly angled side surfaces of the guide. The contact limits the upward movement of the object between the flanges. The extent to which the guide side surfaces extend downwardly from the conveyor channel top wall is determined to stop upward movement of the object through the conveyor slot before the lower part or shoulder of the object becomes wedged and jammed between the conveyor flanges.

As stated earlier, it is not necessary that the guide be formed from a separate strip of material. The downwardly depending side surfaces of the guide can be made an integral part of a conveyor channel extrusion. Additionally, it is not necessary that the side surfaces be flat, angled downwardly surfaces, and may be concave surfaces or other similar surfaces that permit the forwardly and rearwardly swinging of the object in the conveyor slot while limiting the upward movement of the object in the slot.

BRIEF DESCRIPTION OF THE DRAWINGS

Further objects and features of the present invention are set forth in the following detailed description of the preferred embodiments of the invention and in the drawing figures wherein.

DETAILED DESCRIPTION OF THE PREFERRED EMBODIMENTS

Figure 1:
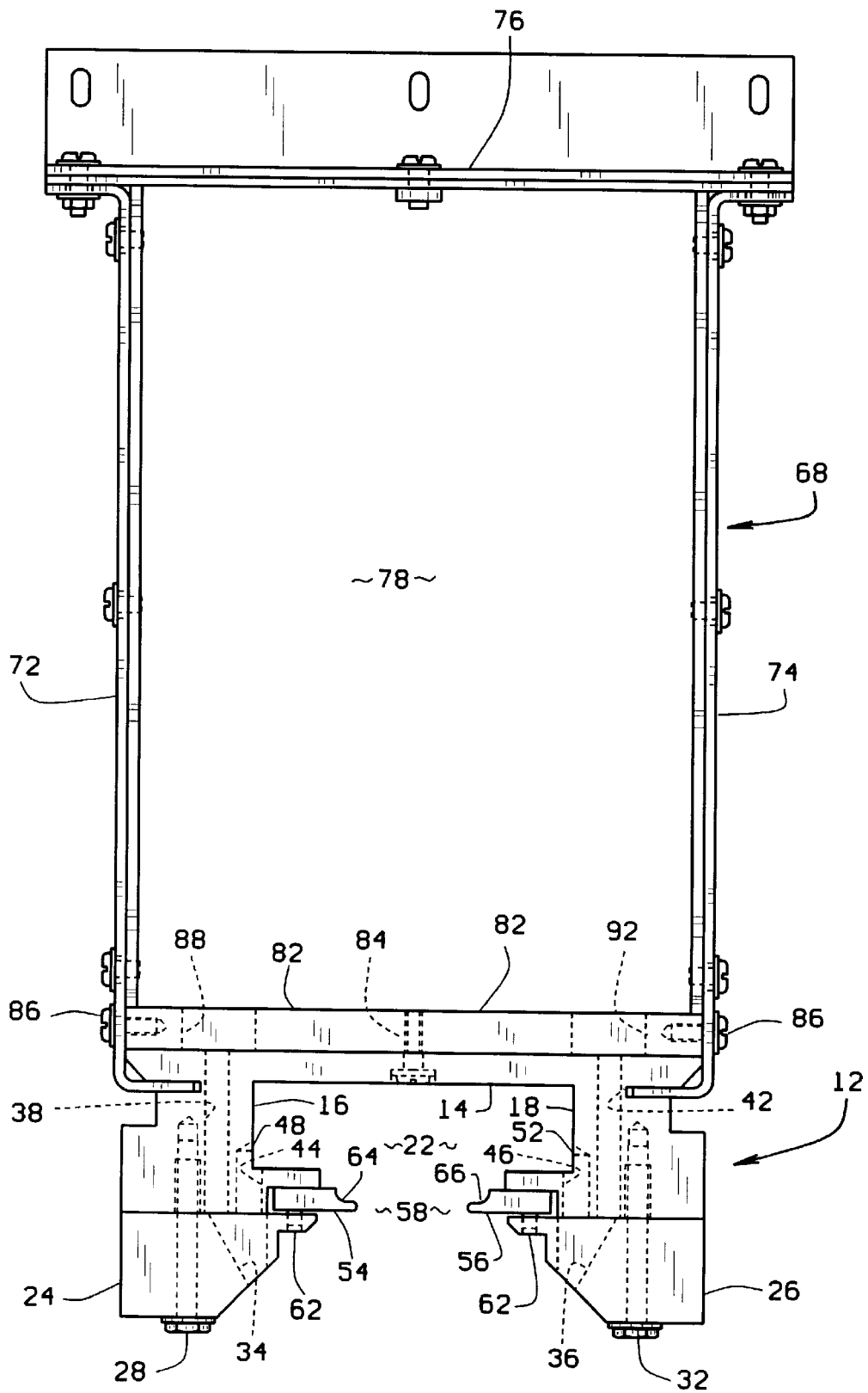
FIG. 1 is an end elevation view of a conventional air conveyor.
Figure 2:
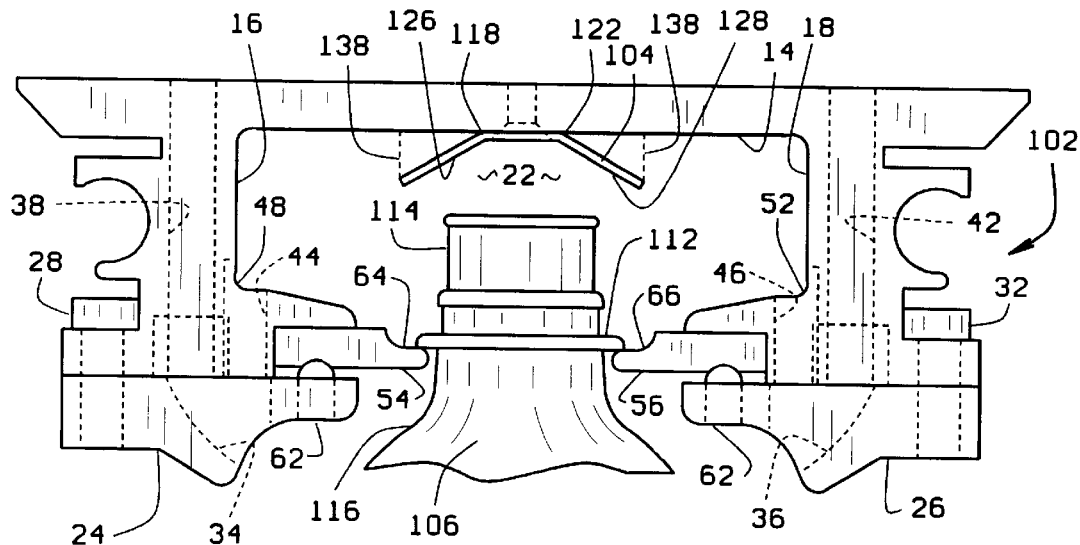
FIG. 2 is an end elevation view of the conveyor of FIG. 1 modified with the guide rail of the present invention.
Figure 3:
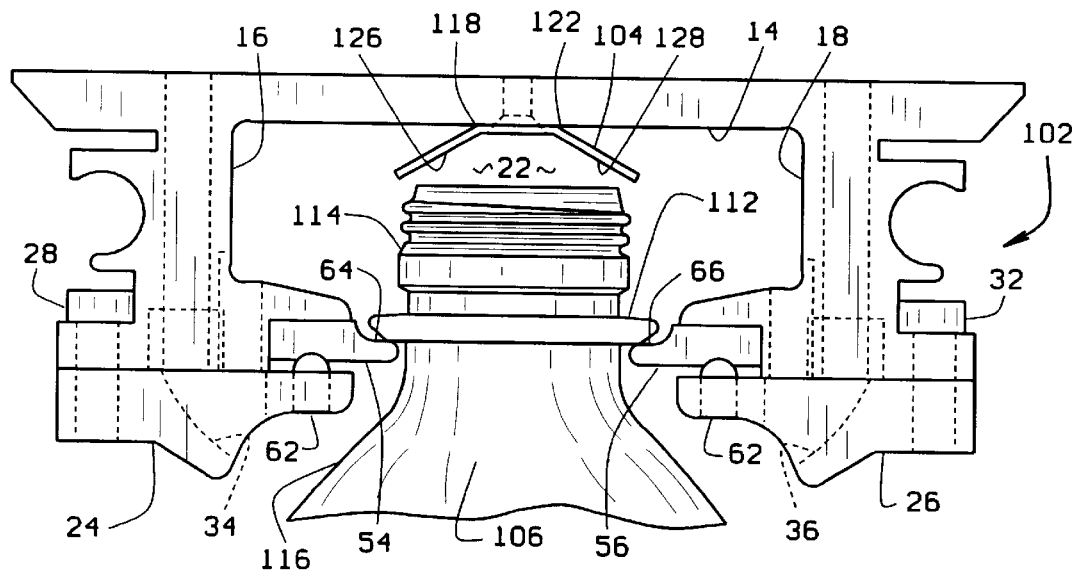
FIG. 3 is an end elevation view similar to that of FIG. 2 illustrating the use of the guide rail in an air conveyor conveying larger objects than that shown in FIG. 2.

FIGS. 2 and 3 show a conveyor channel 102 substantially the same as the conveyor channel 12 shown in FIG. 1 except for minor differences and with the air plenum 68 removed. Apart from changes in shape, the conveyor channel 102 shown in FIGS. 2 and 3 is substantially identical to that of FIG. 1 and like reference numerals are employed in FIGS. 2 and 3 to identify the features and component parts of the conveyor channel 102 that correspond to those features and component parts of the conveyor channel 12 of FIG. 1. Because there are only minor differences in shapes in the component parts between the conveyor channel 102 shown in FIGS. 2 and 3 and the conveyor channel 12 shown in FIG. 1, the description of the conveyor channel and its operation will not be described a second time.

The conveyor channel 102 of FIGS. 2 and 3 differs from that shown in FIG. 1 in that the hold down guide rail 104 of the present invention has been attached to the channel top wall 14. In addition, the conveyor channel 102 is shown in FIGS. 2 and 3 supporting a conventional plastic bottle 106 with the bottle shown in FIG. 2 having a smaller neck diameter (typically 28 millimeters) and the bottle shown in FIG. 3 having a larger neck diameter (typically 38 millimeters). The object, or bottle 106, transported by the conveyor channel 102 of FIGS. 2 and 3 is provided with an intermediate enlargement or neck ring 112, an upper part of the object or neck 114 above the neck ring 112, and a lower part of the object or shoulder 116 of the bottle provided below the neck ring 112.

Figures 4, 5:
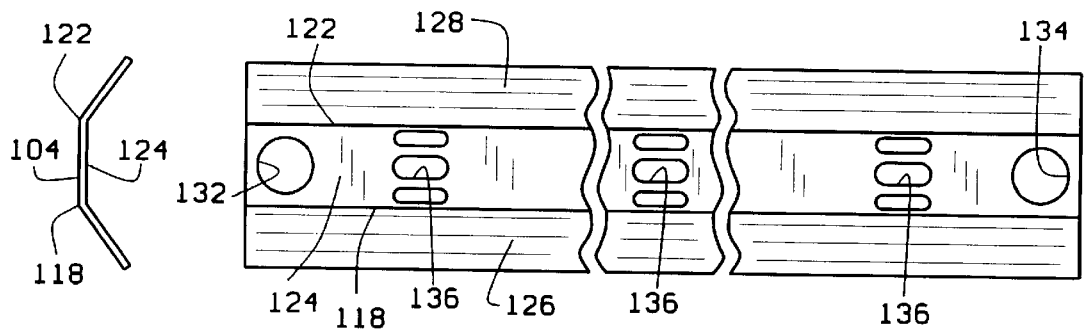
FIG. 4 is an end view of the guide rail removed from the air conveyor.
FIG. 5 is a fragmented plan view of the guide rail of the present invention.

The guide rail 104 of the invention is shown separated from the conveyor channel 102 in FIGS. 4 and 5. The guide rail is formed from a thin strip of material having a length corresponding to the length of the conveyor channel section in which the guide rail is to be installed, although the length of the guide rail may vary. Furthermore, the guide rail may be employed in curved sections of conveyor channel that curve either upwardly, downwardly or side-to-side, and its configuration would match that of the length of channel. The length of guide rail 104 shown in FIG. 4 is to be used in a straight section of conveyor channel. A pair of bends 118, 122 are formed along the length of the guide rail 104 and separate the guide rail into a middle section having a middle surface 124 and two side sections having side surfaces 126, 128. Each of the guide rail bends 118, 122 is identical to the other so that the side surfaces 126, 128 are positioned at angles relative to the middle surface 124 that are mirror images of each other as can be seen in FIGS. 2 and 3. Additionally, the lateral width of the side surfaces 126, 128 are substantially the same as can be seen in FIGS. 2–5. Circular fastener holes 132, 134 are provided at the longitudinally opposite ends of the guide rail 104 for use in attaching the guide rail to the conveyor channel top wall 14. The fastener holes 132, 134, 136 are preferably spacially arranged along the longitudinal length of the guide rail at positions corresponding to positions of fasteners already present in the conveyor channel top surface. This enables use of the conveyor channel fasteners in attaching the guide to the conveyor channel top surface. Additional, oblong fastener holes 136 are also provided along the longitudinal length of the guide rail as alternative means of fastening the guide rail to the conveyor channel top wall 14. The oblong shape of these additional holes 136 permits limited longitudinally adjusting movement of the guide rail relative to the conveyor channel. Preferably, the material employed in constructing the guide rail is aluminum, although other types of similar materials may be employed.

The guide rail 104 is assembled to the conveyor channel top wall 14 in the interior volume of the channel in a position centered above the conveyor channel slot 58. With the middle surface of the guide rail attached to the top wall of the channel by the fasteners present in the top wall, the two side surfaces 126, 128 angle downwardly from the channel top wall as shown in FIGS. 2 and 3. The two side surfaces are positioned directly above the conveyor slot 58 and the flanges 54, 56. The extent to which the two side surfaces 126, 128 extend downwardly limits the upward movement of the bottle conveyed in the conveyor channel on the flanges. If either of the bottles 106 shown in FIG. 2 or FIG. 3 moves upwardly in the channel slot 58, the bottle upper part or neck 114 will come into contact with at least one of the guide rail side surfaces 126, 128 before the bottle shoulder 116 becomes wedged and jammed in the slot 58. Therefore, in conveying bottles along the conveyor channel, should one bottle become stationary and a following bottle impact with the stationary bottle while being conveyed, the upward movement of the following bottle through the slot due to the impact will be limited by the bottle neck 114 contacting the downwardly angled side surfaces 126, 128 of the guide rail. The contact limits the upward movement of the bottle between the flanges and thereby prevents the bottle shoulder 116 from moving upwardly between the conveyor slot 58 to a position where a portion of the bottle shoulder 116 would become wedged between the flanges 154, 156 and jammed in the slot. However, because the side surfaces 126, 128 angle downwardly from the middle surface 124 positioned directly above the center longitudinal axis of the slot 58, sufficient clearance is provided to permit free swinging movement forwardly and rearwardly of the bottle in the conveying path with the bottle neck ring 112 supported on the top surface margins 64, 66 of the flanges.

In a variant embodiment of the invention, the guide rail is not formed from a separate strip of material. The downwardly depending side surfaces of the guide rail can be made as an integral part of a conveyor channel extrusion as is represented by the dashed lines 138, 142 shown in FIG. 2. The dashed lines 138, 142 represent laterally opposite edges of a guide rail that is an integral part of an extruded conveyor channel and also includes the side surfaces 126, 128.

Still further, it is not necessary that the side surfaces of the guide rail be flat, angled downwardly surfaces, and may alternatively be concave surfaces or other similar surfaces that permit the free forwardly and rearwardly swinging movement of the bottle in the conveyor slot while limiting the upward movement of the bottle in the slot.

While the present invention has been described by reference to a specific embodiment, it should be understood that modifications and variations of the invention may be constructed without departing from the scope of the invention defined in the following claims.

What is claimed is:

1. A conveying apparatus for conveying objects wherein each object has an intermediate enlargement and an upper part of the object above the intermediate enlargement and a lower part of the object below the intermediate enlargement, the conveying apparatus comprising:

a pair of laterally spaced flanges extending in a longitudinal direction, the pair of flanges having laterally opposed inner edges defining a slot having a longitudinal center axis therebetween and upper surface margins adjacent the inner edges, the upper surface margins providing slidable support for the intermediate enlargements of the objects with the upper parts and intermediate enlargements of the objects positioned above the slot and the lower parts of the objects positioned below the slot;

a plurality of air ejecting outlets spacially arranged along opposite sides of the slot; and, a guide extending in the longitudinal direction above the slot, the guide being centered above the slot center axis and the guide having a pair of side surfaces that extend laterally away from each other and downwardly toward the slot.

2. The conveying apparatus of claim 1, wherein:
the guide side surfaces are mirror images of each other.

3. The conveying apparatus of claim 1, wherein:
the guide is symmetric on opposite sides of the slot center axis.

4. The conveying apparatus of claim 1, wherein:
the guide side surfaces are flat surfaces.

5. The conveying apparatus of claim 4, wherein:
the guide side surfaces are positioned at an angle relative to each other.

6. The conveying apparatus of claim 1, wherein:
the guide side surfaces are positioned over the slot and the upper surface margins of the flanges.

7. The conveying apparatus of claim 1, wherein:
the guide has a middle surface over the slot and the side surfaces extend laterally from laterally opposite sides of the middle surface.

8. The conveying apparatus of claim 7, wherein:
the middle surface is a flat surface and the pair of side surfaces are flat surfaces that are both oriented at an angle relative to the middle surface.

9. The conveying apparatus of claim 8, wherein:
the guide is a length of sheet material with the middle surface extending along the center of the length of material and the pair of side surfaces extending along laterally opposite edges of the sheet material on opposite sides of the middle surface.

10. The conveying apparatus of claim 1, wherein:
a channel extends over the slot and the pair of flanges, the channel has a top interior surface and the pair of side surfaces extend downwardly from the channel top interior surface.

11. The conveying apparatus of claim 10, wherein:
the guide is attached to the channel top interior surface by fasteners.

12. The conveying apparatus of claim 1, wherein:
a channel extends over the slot and the pair of flanges and the guide is one piece with the channel.

13. The conveying apparatus of claim 12, wherein:
the channel and the guide are parts of a single monolithic extrusion.

14. The conveying apparatus of claim 1, wherein:
the slot has a lateral width that is equal to a width of a portion of the object lower part and the guide is positioned relative to the pair of flanges where it will cause the upper part of the object to contact at least one of the guide side surfaces when the object is lifted in the slot and the intermediate enlargement is raised above the upper surface margins of the flanges, thereby preventing the portion of the object lower part from being lifted into and wedging in the slot.

15. The conveying apparatus of claim 14, wherein:
the guide is positioned relative to the pair of flanges where it will avoid contact with the upper part of the object if the object swings in the slot with the object intermediate enlargement supported on the upper surface margins of the flanges.

16. A conveying apparatus for conveying objects wherein each of the objects has an intermediate enlargement and an upper part of the object above the intermediate enlargement and a lower part of the object below the intermediate enlargement, the conveying apparatus comprising:

a pair of laterally spaced flanges extending in a longitudinal direction, the pair of flanges having laterally opposed inner edges defining a longitudinal slot therebetween and upper surface margins adjacent the inner edges, the upper surface margins providing slidable support for the intermediate enlargements of the objects with the upper parts and intermediate enlargements of the objects positioned above the slot and the lower parts of the objects suspended below the slot;

a plurality of air ejecting outlets spacially arranged along opposite sides of the slot; and a guide extending in the longitudinal direction above the slot, the guide having a middle surface above the slot and the guide having a pair of side surfaces that extend from laterally opposite sides of the middle surface downwardly toward the slot.

17. The conveying apparatus of claim 16, wherein:
the pair of guide side surfaces are positioned above the upper surface margins of the pair of flanges.

18. The conveying apparatus of claim 16, wherein:
the middle surface is a flat surface and each of the side surfaces is a flat surface.

19. The conveying apparatus of claim 16, wherein:
the slot has a lateral width that is equal to a width of a portion of the object lower part and the guide is positioned a vertical distance above the pair of flanges where at least one of the guide side surfaces will contact the object upper part when the object is lifted in the slot and the intermediate enlargement is raised above the upper surface margins of the flanges, thereby preventing the portion of the object lower part from being lifted into and wedging in the slot.

20. The conveying apparatus of claim 16, wherein:
the slot has a lateral width that is equal to a width of a portion of the object lower part, the portion of the object lower part is a set distance below the object intermediate enlargement, and the guide is positioned a vertical distance above the pair of flanges where a minimum clearance is provided between the guide and the object upper part with the object intermediate enlargement supported on the upper surface margins of the flanges, and the minimum clearance is smaller than the set distance of the portion of the object lower part below the object intermediate enlargement.

* * * * *